United States Patent [19]

Watts

[11] 4,355,818
[45] Oct. 26, 1982

[54] FISHERMAN'S CART

[76] Inventor: Ronald C. Watts, 4507 Rocky River Rd., Charlotte, N.C. 28205

[21] Appl. No.: 167,057

[22] Filed: Jul. 9, 1980

[51] Int. Cl.³ .............................................. B62B 1/26
[52] U.S. Cl. .................................. 280/654; 280/47.19; 280/47.26
[58] Field of Search ................... 280/40, 654, 47.18, 280/47.19, 47.28, 651, 652, 47.26; 248/129

[56] References Cited

U.S. PATENT DOCUMENTS

| | | | |
|---|---|---|---|
| 2,769,645 | 11/1956 | Young | 296/65 R X |
| 2,823,923 | 2/1958 | Marquardt | 280/654 |
| 2,835,503 | 5/1958 | Humphries et al. | 280/47.19 |
| 3,052,484 | 9/1962 | Huffman et al. | 280/47.19 X |
| 3,620,546 | 11/1971 | Anderson | 280/40 |
| 3,930,663 | 1/1976 | Scripter | 280/654 |
| 3,997,181 | 12/1976 | Jaco et al. | 280/47.26 X |
| 4,284,286 | 8/1981 | Lewaller | 280/654 X |

Primary Examiner—Richard A. Bertsch
Assistant Examiner—Michael Mar
Attorney, Agent, or Firm—Bell, Seltzer, Park & Gibson

[57] ABSTRACT

A cart for fisherman's gear and paraphernalia includes a normally upright wheeled main frame on which a plurality of vertical spaced horizontal shelves are positioned with an auxiliary frame connected to lower portions of the main frame and extending upwardly and forwardly at an angle therefrom for supportingly engaging a frontal portion of at least one of the shelves, and the auxiliary frame is provided with receptacles thereon for receivingly supporting handle portions of fishing rods for supporting the same during fishing. The cart is especially constructed so that it may be readily erected and collapsed to facilitate transporting the same from place to place.

12 Claims, 11 Drawing Figures

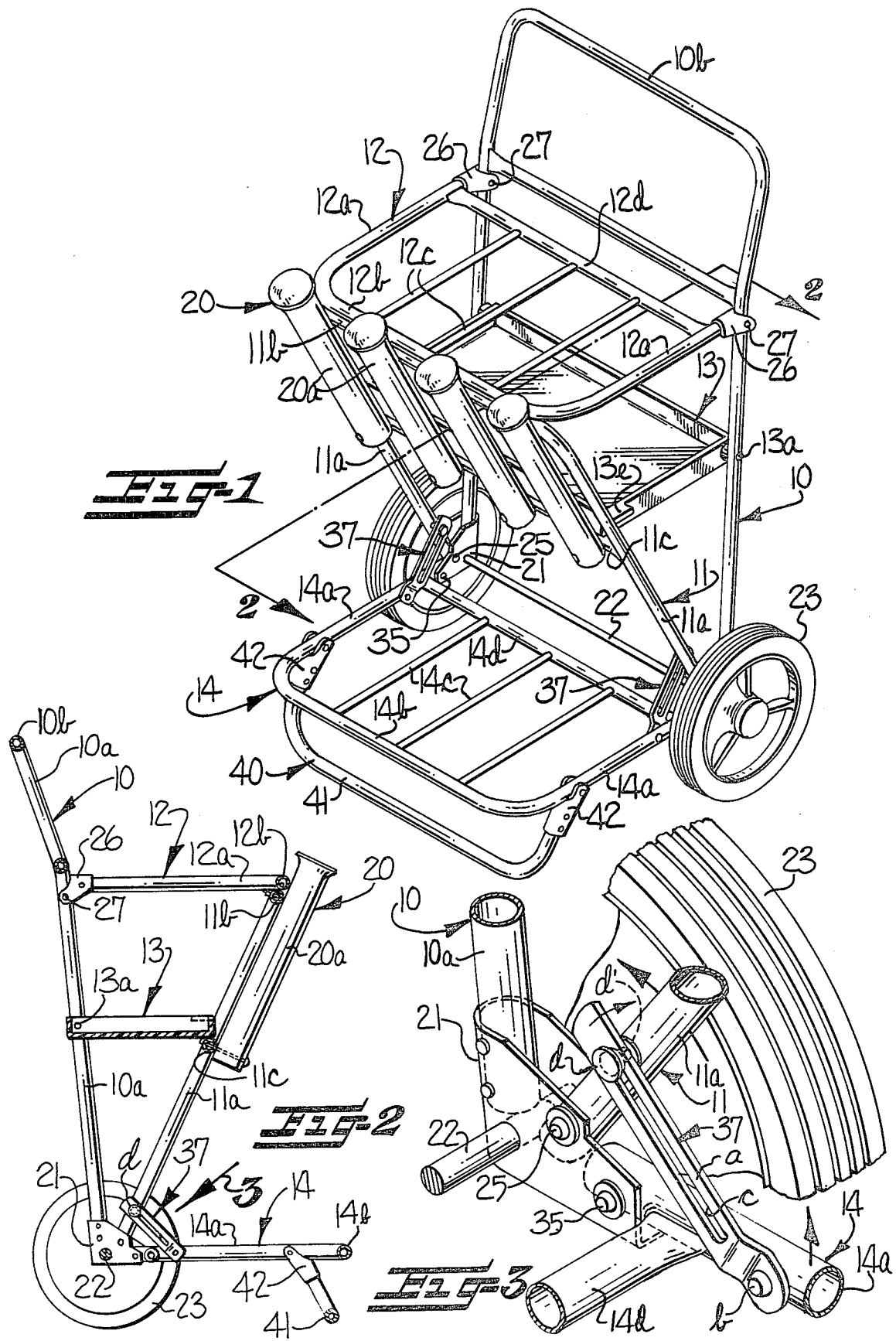

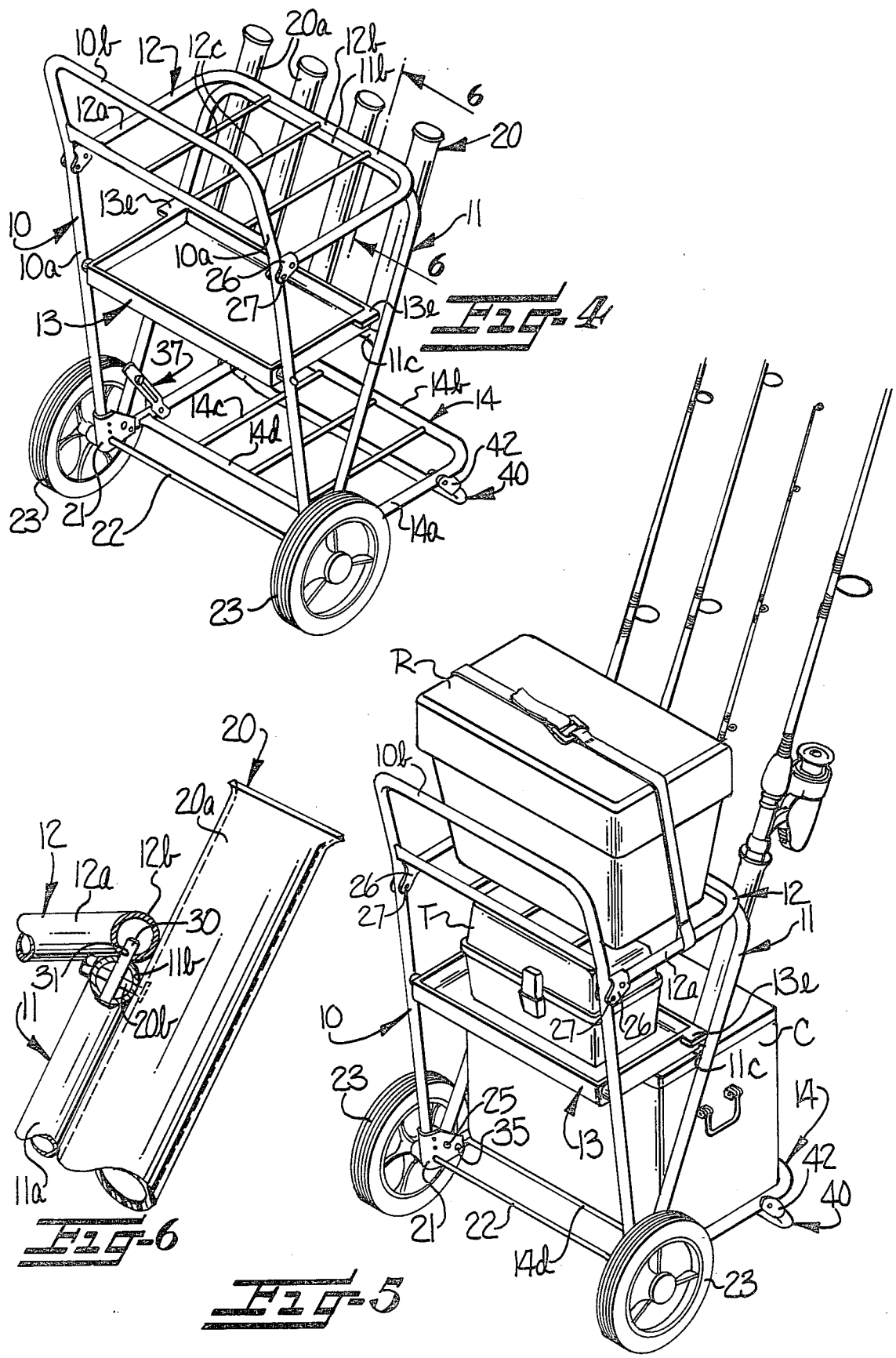

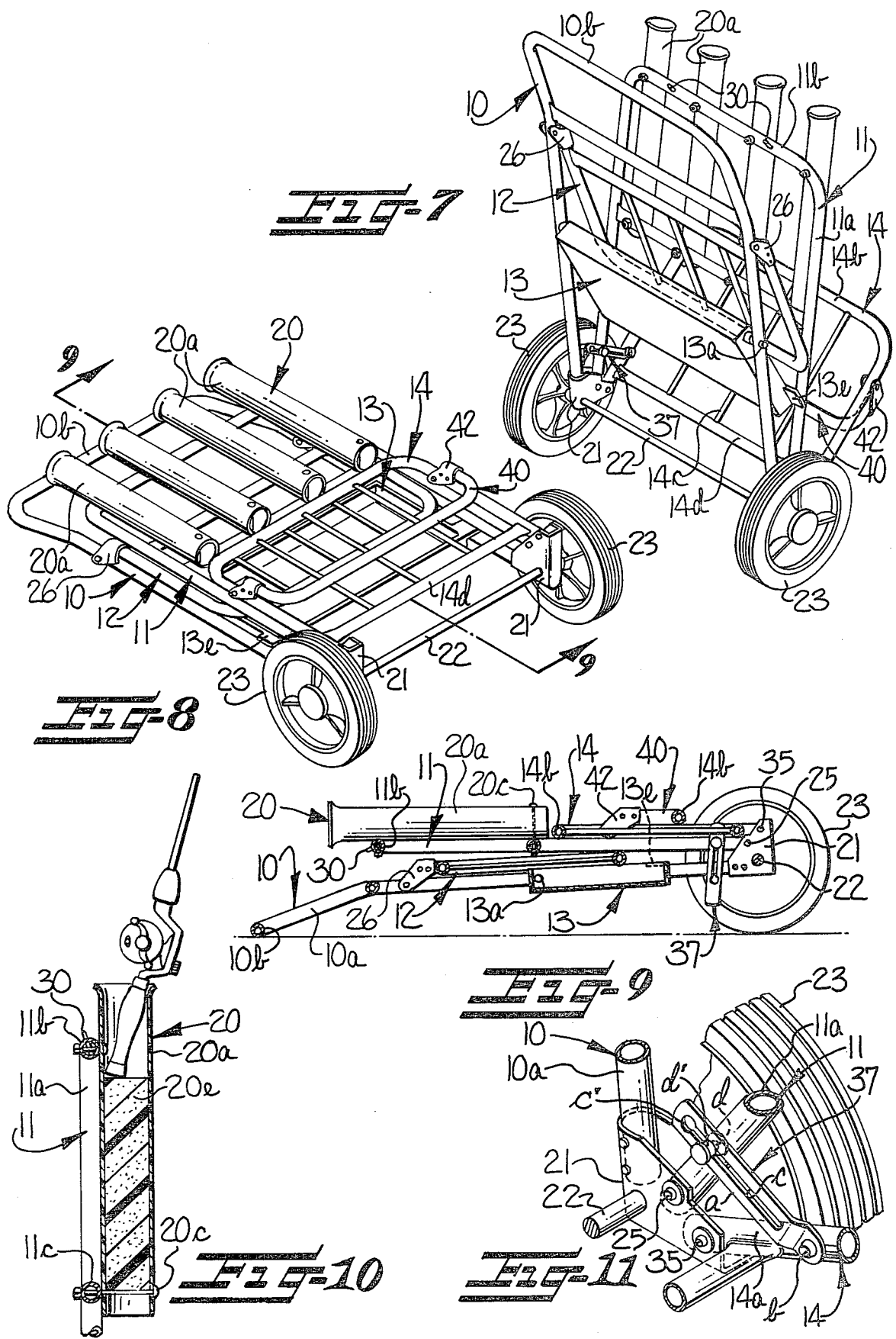

FISHERMAN'S CART

This invention relates to wheeled carts and more particularly to a wheeled cart constructed for use by fishermen in transporting their fishing gear and paraphernalia from a vehicle to a fishing site.

As near as can be determined, the only types of wheeled conveyances that fishermen have utilized in transporting their fishing gear from the trunks of their cars, for example, to a fishing site, have been four-wheeled conveyances of the toy wagon type or wheeled shopping carts. While these types of conveyances aid in the transporting of fishermen's gear, such as an icebox for the fish, cooler for the fishermen's food, tackle box and various types of fishing rods, such conveyances have not been widely used due to the space requirements in the trunk of a car for transporting the same, as well as the limited ability to carry all of the fishing gear without damage thereto, and in one easy trip.

With the foregoing in mind, it is the primary object of this invention to provide a wheeled cart, preferably collapsible, and which is constructed to readily be carried in a compact collapsed condition in the trunk of a vehicle, for example, and thereafter quickly erected for carrying various types of fishing gear and paraphernalia to the desired fishing site.

It is a further object of the invention to provide a wheeled fishing cart of the type described wherein the cart is provided with a plurality of open-topped receptacles on frontal portions thereof for receiving handle portions of fishing rods therein for supporting the fishing rods during use.

Some of the objects of the invention having been stated, other objects will appear as the description proceeds when taken in connection with the accompanying drawings in which:

FIG. 1 is a perspective view of the improved fisherman's cart in an erected substantially upright position as when opened for use;

FIG. 2 is a vertical sectional view taken substantially along line 2—2 in FIG. 1;

FIG. 3 is an enlarged fragmentary perspective view looking in the direction of the arrow 3 in FIG. 2, and particularly illustrating releasable brace means for aiding in maintaining the cart in a generally upright position when in use;

FIG. 4 is a perspective view looking at the rear and opposite side of the cart shown in FIG. 1;

FIG. 5 is a view similar to FIG. 4 illustrating how fishing paraphernalia may be supported on the cart during fishing;

FIG. 6 is an enlarged fragmentary elevational view, partially in section, looking substantially along line 6—6 in FIG. 4;

FIG. 7 is another perspective view similar to FIG. 4, but showing the cart in a partially folded or collapsed condition;

FIG. 8 is another perspective view showing the cart in fully collapsed condition;

FIG. 9 is a longitudinal sectional view taken substantially along line 9—9 in FIG. 8;

FIG. 10 is a fragmentary sectional view through a receptacle receivingly supporting therein the handle portion of a fishing rod for supporting the same during fishing; and FIG. 11 is a view similar to FIG. 3, but wherein portions of a bottom shelf and an inclined auxiliary frame of the cart are shown in partially collapsed or folded condition to better illustrate the releasable brace means associated therewith.

While this invention will be described hereinafter with particular reference to the accompanying drawings, in which an illustrative embodiment of the present invention is set forth, it is to be understood at the outset of the description which follows that it is contemplated that persons skilled in the applicable arts may modify the specific details to be described while continuing to use this invention. Accordingly, the description is to be understood as a broad teaching of this invention, directed to persons skilled in the applicable arts.

Referring more specifically to the drawings, the improved fisherman's cart generally comprises a wheeled main frame 10 adapted to normally occupy a substantially upright position, a normally inclined auxiliary frame 11, and a plurality of vertically spaced normally substantially horizontal shelves carried by and extending forwardly from the main frame 10. As shown, the cart is provided with three such shelves, including an uppermost or top shelf 12, an intermediate shelf 13 and a lowermost or bottom shelf 14. As will be later described more in detail, auxiliary frame 11 is connected to lower portions of main frame 10 and extends upwardly and forwardly at an angle from the main frame 10 for supportingly engaging frontal portions of the top and intermediate shelves 12, 13, and means embodied in a plurality of open-topped receptacles 20, are provided for receivingly supporting handle portions of fishing rods (FIGS. 5 and 10) for supporting the fishing rods during fishing.

Referring to the cart more in detail, as best shown in FIGS. 1 and 4, the main and auxiliary frames 10, 11 are of generally inverted U-shaped form, and the top and bottom shelves 12, 14 also are of generally U-shaped form, it being preferred that the frames 10, 11 and shelves 12, 14 are of lightweight skeletal construction and formed from metal tubing, for example. The main frame 10 includes a pair of spaced substantially parallel, normally upright side frame members 10a whose upper portions are formed integral with a transverse frame member or handle portion 10b. The upper end portions of side frame members 10a preferably are formed at a shallow upwardly and rearwardly inclined angle relative to the major portions thereof, as best shown in FIGS. 1, 2 and 9, so the handle portion 10b will normally be spaced from an article on the top shelf 12.

A bracket means 21 is suitably secured on the lower end portion of each side frame member 10a of main frame 10, and lower portions of the bracket means 21 are penetrated by an axle or rod 22 serving to mount wheel means to the lower end portions of the upright side frame members 10a of main frame 10. In this instance, the wheel means is shown in the form of a pair of ground wheels 23 mounted on opposite end portions of axle 22 outwardly of and adjacent the side frame members 10a of main frame 10.

The auxiliary frame 11 also includes a pair of generally parallel side frame members 11a complementing the upright side frame members 10a of main frame 10 and with corresponding ends of the side frame members 11a being positioned in bifurcated forward portions of the respective bracket means 21 and pivotally connected to the bracket means, as at 25, on an axis forwardly of and adjacent the lower portions of side frame members 10a of main frame 10. Thus, auxiliary frame 11 is pivotally connected to the bracket means 21 for angular movement rearwardly toward and alongside, and away, from main frame 10.

The top and bottom shelves 12, 14 also comprise respective pairs of spaced side frame members or rails 12a, 14a whose outer ends are connected to and may be formed integral with respective transverse frame members or cross rails 12b, 14b. The rear ends of the side rails 12a of top shelf 12 are pivotally connected, on an axis generally parallel to the pivotal axis of auxiliary frame 11, to an upper medial portion of main frame 10 and in such manner that the top shelf 12 may be pivoted downwardly from the forwardly extending horizontal position and rearwardly into a position extending substantially vertically and compactly alongside or parallel with main frame 10. To this end, the rear ends of the side rails 12a of top shelf 12 have respective brackets or cuff members 26 secured thereon whose outer portions, remote from side rails 12a, are offset with respect to the side rails 12a with such offset portions of the brackets 26 being pivotally connected, as at 27, to the side frame members 10a of the main frame 10. Thus, it can be seen that the pivot points 27 are offset from the longitudinal axes of the respective side rails 12a of top shelf 12 and toward bracket means 21 for permitting the folding of side rails 12a downwardly and rearwardly against the front surfaces of side frame members 10a of main frame 10 (see FIGS. 7-9).

When top shelf 12 is pivoted forwardly to extend at about a right angle to main frame 10, and the frontal portion or cross rail 12b of top shelf 12 is being supportingly engaged by auxiliary frame 11, the auxiliary frame 11 is then maintained at the desired angle relative to the main frame 10 by suitable means detachably or releasably interconnecting the outer transverse frame member 11b of auxiliary frame 11 and the frontal portion or outer end frame member 12b of top shelf 12. Preferably, the latter means comprises cooperating male and female components. To this end, it will be observed in FIGS. 6, 7, 9 and 10 that the transverse frame member 11b of auxiliary frame 11 has means, in the form of a pair of spaced pins 30, projecting upwardly therefrom for being received in respective holes 31 (FIG. 6) in the cross rail 12b of top shelf 12. Thus, cross rail 12b serves as means for surroundingly engaging the projecting means or pins 30 at each of the holes 31 for thereby releasably interconnecting auxiliary frame 11 and the frontal portion of top shelf 12. Although the pins 30 are shown projecting outwardly from the transverse frame member 11b of auxiliary frame 11, it is apparent that they may be secured to the cross rail 12b of top shelf 12 with the holes 31 then being present in the transverse frame member 11b of the auxiliary frame 11, if desired.

To further facilitate collapsing and folding the cart into a compact unit as shown in FIGS. 7, 8 and 9, it will be observed in FIGS. 1-5 that the rear or inner end portions of the side rails 14a of bottom shelf 14 are pivotally connected to the respective bracket means 21, as at 35, on an axis forwardly of and substantially parallel to the pivotal axis of auxiliary frame 11. Also, detachable means, embodied in a releasable brace means broadly designated at 37, is provided for normally maintaining auxiliary frame 11 at an acute angle relative to main frame 10 and shelf 14, and to, in turn, maintain the bottom shelf in a substantially horizontal position when main frame 10 occupies its normally upright position.

Accordingly, the releasable brace means 37 comprises an elongate brace member or link a pivotally connected to each side rail 14a of bottom shelf 14, as at b (FIGS. 3 and 11). Each link a is provided with a longitudinally extending slot c therein adapted to be slidably penetrated by a reduced portion of a shouldered locking pin d carried by and projecting inwardly from a lower portion of the respective side frame member 11a of auxiliary frame 11, during relative pivotal movement between frame 11 and bottom shelf 14 about their respective pivots 25, 35. Each locking pin d has an enlarged portion d' remote from the respective side frame member 11a which is adapted to be slidably received in an enlarged opening or bore c' adjacent the rear end of link a and communicating with the slot c so that, in effect, the slot c is a bayonet slot.

It is apparent that, when the enlarged portion d' of locking pin d is positioned in the opening c' in link a, this serves for normally maintaining auxiliary frame 11 and bottom shelf 14 in the desired fixed relationship. The rear portion of link a is inherently biased away from the respective side frame member 11a of auxiliary frame 11 so that opening c' therein will permit the link a to move outwardly at its rear portion into engagement with the head of the locking pin d upon auxiliary frame 11 and bottom shelf 14 being moved apart from each other a predetermined amount. On the other hand, when the fisherman wishes to collapse or fold the cart as in FIGS. 7, 8 and 9 for transporting the cart from one place to another in a car or other carrying vehicle, the fisherman then presses the rear end portions of links a outwardly toward side frame members 11a of auxiliary frame 11 to disengage the wall of the opening c' from the enlarged portion d' of locking pin d, whereupon the reduced portions of corresponding locking pins d then may be traversed by the slots c in links a as the bottom shelf 14 is pivoted upwardly and forwardly toward and into proximal or substantially abutting relation to side frame members 11a of auxiliary frame 11, as shown in FIGS. 8 and 9.

To facilitate moving the cart over the ground, it is desirable to provide substantial clearance between the bottom of the bracket means 21 and the ground. Thus, the bottom shelf 14 generally is adapted to be positioned on a level generally corresponding to that of the axle 22, and foot means 40 is pivotally connected to the bottom shelf and normally extends downwardly and forwardly at an angle beneath the bottom shelf 14 for resting upon a supporting surface when the cart is at rest. In this instance, foot means 40 is shown in the form of an elongate bar having upturned opposite ends, each of which has a cuff member 42 thereon pivotally connected to a medial portion of the respective side rail 14a of the bottom shelf 14. The cuff members 42 are bifurcated so as to straddle the respective side rails 14a of bottom shelf 14 and so that the cuff members 42 then will engage the lower surfaces of the respective side rails 14a when the foot means is pivoted forwardly and downwardly to extend downwardly and forwardly at an angle from the side rails 14a as best shown in FIGS. 1, 2, 4 and 5.

As indicated earlier herein, the top and bottom shelves 12, 14 are of skeletal construction. Accordingly, the shelves 12, 14 may include respective groups of spaced substantially parallel rods or bars 12c, 14c whose frontal portions are suitably secured to the respective transverse frame members 12b, 14b and whose rear portions are suitably secured to respective rear transverse frame members 12d, 14d extending between and being suitably secured to rear portions of the respective pairs of side rails 12a, 14a, and spaced forwardly of the rear ends of the side rails 12a, 14a to accommodate the cuff members 26 and the bracket means 21, respectively.

Preferably, the intermediate shelf 13 is in the form of a walled, substantially rectangular and relatively shallow tray whose rear portion is pivotally mounted, as at 13a, between side frame members 10a of main frame 10. The auxiliary frame 11 includes an intermediate transverse frame member 11c which extends between and is suitably secured to side frame members 11a, and is so located as to support the frontal portion of the tray or intermediate shelf 13 in a substantially horizontal position, with the lower frontal portion of tray 13 then being positioned between side frame members 11a of auxiliary frame 11. In order to limit the rearward and downward swinging movement of tray 13 when the cart is to be collapsed and auxiliary frame 11 is pivoted forwardly of that position in which it is shown in FIGS. 1, 2, 4 and 5 relative to main frame 10, the upper frontal portions of the opposing side walls of tray 13 are provided with outwardly projecting abutments or tabs 13e thereon which may bear against the front surfaces of the side frame members 10a of main frame 10 when the cart is in the collapsed condition shown in FIGS. 8 and 9.

As heretofore described, the receptacles 20 serve as a preferred embodiment of means carried by the auxiliary frame 11 for receivingly supporting handle portions of fishing rods for supporting the fishing rods during fishing. Accordingly, it will be observed in FIGS. 1 and 6 that a group of four of the receptacles 20 is secured to the upper front portion of auxiliary frame 11, each of the receptacles being shown in the form of an elongate tube 20a preferably formed of a rigid plastic material and having a flared mouth at its upper end. Medial and lower portions of each receptacle 20 are secured to the upper transverse frame member 11b and the intermediate transverse frame member 11c of the auxiliary frame 11, as by screws 20b, 20c (FIGS. 6 and 10). As preferred, the screw 20c extends entirely through and across the lower portion of each respective tube 20a for supportingly retaining the handle portion of a corresponding fishing rod in the respective receptacle 20. In this instance, it will be observed in FIG. 10 that each tube 20a may be provided with a suitable spacing means 20e therein, resting upon the respective screw 20c, and being of a desired length so as to accommodate the particular type of fishing rod handle portion then being used. The spacer means 20e may be made from a suitable lightweight plastic material, such as styrofoam. It will be noted that, while the cart is in use, since auxiliary frame 11 is inclined upwardly and forwardly at an angle relative to the upright main frame 10, the receptacles 20 are also inclined upwardly and forwardly at an angle corresponding substantially to the angle of auxiliary frame 11.

It is to be noted also that the cart is collapsed by an operator first lifting the frontal frame member 12b of top shelf 12 sufficiently away from transverse frame member 11a of auxiliary frame 11 to clear the pins 30 (FIG. 6) and then tilting main frame 10 rearwardly away from auxiliary frame 11 so as to disengage intermediate shelf 13 from frame member 11c. The intermediate shelf 13 then may be swung rearwardly followed by a similar swinging of top shelf 12 to position them respectively between and against the side frame members 10a of main frame 10 in the successive stages of FIGS. 7 and 8 or FIGS. 7 and 9.

Thereafter, the operator or fisherman may release the links a of the releasable brace means 37 from the lock pins d in the manner heretofore described so that the reduced portions of the locking pins d may move in the slots c (FIG. 11) relative to the respective links a thus permitting the operator to fold the bottom shelf 14 upwardly and rearwardly against the side frame members 11a of the auxiliary frame 11, as shown in FIGS. 8 and 9. It will be noted that the auxiliary frame 11 may be folded into compact relation to the main frame 10 either before or after the links a are released with respect to the locking pins d, it being further noted in FIGS. 8 and 9 that the auxiliary frame 11 then may rest against the top shelf 12 previously folded against the side frame members 10a of main frame 10.

It is also to be noted that the receptacles 20 are positioned against the front face, in effect, of the auxiliary frame 11 so as to permit auxiliary frame 11 to be readily folded inwardly against the top shelf 12 previously folded against the front surfaces of the side frame members 10a of main frame 10. Additionally, the receptacles 20 are so positioned on the auxiliary frame 11 that their lower ends terminate adjacent, but in spaced relation from, the transverse frame member 14b of the bottom shelf 14, thus permitting the bottom shelf 14 to be folded compactly against the front face of auxiliary frame 11 as in FIGS. 8 and 9. In other words the size of bottom shelf 14 and the position and length of the open-topped receptacles 20 are such that, when the cart is collapsed, the bottom shelf extends substantially parallel to main frame 10 and lies in substantially the same plane as the group of receptacles 20 to aid in providing a compact collapsed cart. To complete the collapsing of the cart, the foot means 40 also may be readily folded downwardly and rearwardly against the bottom shelf 14. Thus, a compact portable cart is provided which may be readily positioned in a transporting vehicle, such as the trunk of an automobile. Since the cart may be readily erected essentfally by following the foregoing procedure in a reverse manner, a more detailed description thereof is deemed unnecessary.

From the foregoing disclosure, it can be seen that there is provided an improved cart for fisherman's gear, such as a cooler, a tackle box, and a refreshment container, indicated at C, T and R on the respective shelves 14, 13 and 12 in FIG. 5, and wherein the cart includes a wheeled main frame 10 which is normally adapted to occupy a substantially upright position and which has a plurality of vertically spaced shelves 12, 13, 14 which extend forwardly and substantially horizontally from the main frame 10 during normal use of the cart. Further, it can be seen that the cart includes an auxiliary frame 11 which is connected to lower portions of the main frame 10 and extends upwardly and forwardly at an angle from the main frame 10 and supportingly engages a frontal portion of at least one of the shelves, such as the top shelf 12, and wherein means are carried by the auxiliary frame 11 for receivingly supporting handle portions of fishing rods for supporting fishing rods during fishing. It will be understood that the various fishing gear paraphernalia on the cart would serve for stabilizing and anchoring the wheeled cart while the fishing rods are being supportingly carried in the receptacles during fishing. It can be seen further that the cart may readily be erected and collapsed to facilitate carrying the same from place to place, as in the trunk of an automobile for example.

In the drawings and specification there has been set forth a preferred embodiment of the invention, and although specific terms are employed, they are used in a generic and descriptive sense only and not for purposes of limitation, the scope of the invention being defined in the claims.

That which is claimed is:

1. A cart for fisherman's gear comprising
a wheeled main frame adapted to normally occupy and be supported in a substantially upright position,
a plurality of vertically spaced, substantially horizontally positioned shelves carried by and extending forwardly from said main frame,
an auxiliary frame connected to a lower portion of said main frame and extending upwardly and forwardly at an angle from said main frame and supportingly engaging a frontal portion of at least one of said shelves,
means carried by said auxiliary frame for receivingly supporting handle portions of fishing rods for supporting the fishing rods during fishing, and
wherein another of said plurality of shelves is positioned below said means for receivingly supporting handle portions of fishing rods.

2. A cart according to claim 1 wherein said means for supporting fishing rods comprises a plurality of elongate, open-topped, upwardly and forwardly inclined receptacles secured to said auxiliary frame.

3. A cart according to claim 1 wherein said shelves are pivotally mounted for movement from said forwardly extending horizontal position to a position extending substantially vertically and compactly alongside said main frame, and wherein said auxiliary frame is pivotally connected to said lower portion of said main frame for pivotal movement rearwardly toward and alongside, and away from said main frame, and wherein the cart further comprises means releasably interconnecting said auxiliary frame and said frontal portion of said one of said shelves for permitting pivotal movement of said auxiliary frame rearwardly into collapsed relation to said main frame.

4. A cart according to claim 3 wherein said frontal portion of said one of said shelves overlies an upper end portion of said auxiliary frame, and said means releasably interconnecting said auxiliary frame and said frontal portion of said one of said shelves comprises cooperating male and female components.

5. A cart according to claim 3 wherein said frontal portion of said one of said shelves overlies an upper end portion of said auxiliary frame, and said means releasably interconnecting said auxiliary frame and said frontal portion of said one of said shelves comprises means projecting upwardly from said upper end portion of said auxiliary frame, and means on said frontal portion for surroundingly engaging said projecting means.

6. A cart according to any one of claims 1 to 5 wherein said one of said shelves is an upper shelf of said plurality of shelves, and further comprising means pivotally connecting a rearward portion of said upper shelf to said main frame.

7. A cart according to claim 1 wherein said another of said plurality of shelves is a bottom shelf having a rear portion connected to said lower portin of said main frame, and foot means connected to forward portions of said bottom shelf for resting upon a supporting surface when the cart is at rest.

8. A cart according to claim 1 wherein said one of said shelves is a walled, substantially rectangular and relatively shallow tray.

9. A cart for fisherman's gear comprising
a main frame adapted to normally occupy and be supported in a substantially upright position when in use, wheel means mounted to and supporting a lower portion of said main frame for movement over a surface,
an upper shelf pivotally mounted on and extending forwardly from an upper portion of said main frame,
an auxiliary frame having a lower portion pivotally connected to said lower portion of said main frame for pivotal movement toward and away from said main frame on an axis generally parallel to the axis of said wheel means and supportingly engaging a frontal portion of said upper shelf so that said upper shelf normally occupies a substantially horizontal position and said auxiliary frame normally extends upwardly and forwardly at an angle relative to said main frame,
a bottom shelf pivotally connected to said lower portion of said main frame,
releasable means extending between and normally interconnecting said bottom shelf and said auxiliary frame for normally maintaining said bottom shelf in a substantially horizontal position and maintaining said auxiliary frame in an upwardly and forwardly inclined position, and
means carried by said auxiliary frame for receivingly supporting handle portions of fishing rods for supporting the fishing rods during fishing,
whereby pivotal movement of said upper shelf, said auxiliary frame and said bottom shelf relative to said main frame serves to permit folding of said upper shelf, said auxiliary frame and said bottom shelf rearwardly toward said main frame for collapsing the cart when said releasable means is released.

10. A portable cart for fisherman's gear comprising
a main frame adapted to normally occupy and be supported in a substantially upright position, and wheel means supporting a lower end portion of said main frame for movement over a surface,
an auxiliary frame having a lower end portion pivotally connected to said main frame lower end portion for pivotal movement toward and away from said main frame on an axis generally parallel to the axis of said wheel means,
an upper shelf pivotally mounted on an upper portion of said main frame,
means detachably interconnecting an upper portion of said auxiliary frame to a frontal outer end portion of said shelf with said shelf occupying a substantially horizontal position at substantially a right angle to said main frame for thereby maintaining said auxiliary frame at an acute angle to said main frame,
means carried by said auxiliary frame for receivingly supporting handle portions of fishing rods for supporting the fishing rods during fishing,
a bottom shelf adapted to occupy a substantially horizontal position beneath said upper shelf, means pivotally connecting a rear portion of said bottom shelf to said lower end portion of said main frame, and releasable brace means extending between and normally interconnecting proximal portions of said auxiliary frame and said bottom shelf for normally maintaining said bottom shelf in said substantially horizontal position, whereby upon detaching said upper shelf from said auxiliary frame and swinging said auxiliary frame forwardly away from said main frame, said upper shelf may be pivoted on its axis, and upon said releasable brace means being released, said bottom shelf also may be pivoted on its axis to permit folding the cart.

11. A portable cart for fisherman's gear comprising a main frame adapted to normally occupy and be supported in a substantially upright position and being of generally inverted U-shaped form and including a pair of spaced substantially parallel, normally upright side frame members, bracket means secured on lower end portions of said upright frame members, and wheel means mounted to and supporting said lower end portions of said upright side frame members, an auxiliary frame having a pair of generally parallel side frame members complementing said upright side frame members with corresponding ends of said side frame members of said auxiliary frame being pivotally connected to said bracket means for angular movement rearwardly toward and alongside, and away, from said main frame about an axis forwardly of said main frame, top and intermediate shelves pivotally connected, on axes generally parallel to the pivotal axis of said auxiliary frame, to respective upper and lower medial portions of said side frame members of said main frame, means detachably connecting said top shelf to an outer end portion of said auxiliary frame and being located so that said auxiliary frame then extends upwardly from its pivotal axis at an acute angle relative to said main frame with said top shelf then normally occupying a substantially horizontal position, a bottom shelf pivotally connected to said bracket means on an axis forwardly of and substantially parallel to the pivotal axis of said auxiliary frame, releasable brace means extending between and normally interconnecting rear portions of said bottom shelf to lower portions of said auxiliary frame for normally maintaining said auxiliary frame at said acute angle and in turn maintaining said bottom shelf in a substantially horizontal position when said main frame side frame members occupy said normally upright position, and a plurality of substantially parallel, upwardly and forwardly inclined open-topped receptacles secured to the upper front portion of said auxiliary frame for receiving handle portions of fishing rods therein for supporting the fishing rods during fishing.

12. A cart for fisherman's gear comprising a wheeled main frame adapted to normally occupy and be supported in a substantially upright position, and forwardly extending, substantially horizontally positioned upper, intermediate and lower shelves pivotally mounted on said main frame for movement from said forwardly extending position to a collapsed position extending substantially vertically and compactly alongside said main frame, an auxiliary frame pivotally connected to a lower portion of said main frame and normally extending upwardly and forwardly at an angle away from said main frame and supportingly engaging frontal portions of said upper and intermediate shelves, said auxiliary frame being pivotally movable rearwardly toward and alongside said main frame, a plurality of substantially parallel upwardly and forwardly inclined open-topped receptacles connected to the upper front portion of said auxiliary frame for receiving handle portions of fishing rods therein for supporting the fishing rods during fishing, and the size of said lower shelf and the position and length of said open-topped receptacles being such that when the cart is collapsed, with said shelves in said position alongside said main frame and with said auxiliary frame positioned alongside said main frame, the lower shelf extends substantially parallel to said main frame and lies in substantially the same plane as said plurality of receptacles to aid in providing a compact collapsed cart.

* * * * *